United States Patent
Bommireddipalli et al.

(10) Patent No.: US 9,215,243 B2
(45) Date of Patent: Dec. 15, 2015

(54) IDENTIFYING AND RANKING PIRATED MEDIA CONTENT

(71) Applicant: International Business Machines Corporation, Armonk, NY (US)

(72) Inventors: Vijaykumar R. Bommireddipalli, San Jose, CA (US); Laura Chiticariu, San Jose, CA (US); Yunyao Li, San Jose, CA (US); Richard S. Maraschi, Enrico, CA (US); Ah-Fung Sit, San Jose, CA (US); Shivakumar Vaithyanathan, San Jose, CA (US); Shankar Venkataraman, Fremont, CA (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 162 days.

(21) Appl. No.: 14/042,495

(22) Filed: Sep. 30, 2013

(65) Prior Publication Data

US 2015/0096041 A1     Apr. 2, 2015

(51) Int. Cl.
*G06F 7/04* (2006.01)
*H04L 29/06* (2006.01)
*G06F 17/30* (2006.01)
*G06F 17/22* (2006.01)
*G06F 21/60* (2013.01)

(52) U.S. Cl.
CPC ........ *H04L 63/1416* (2013.01); *G06F 17/2235* (2013.01); *G06F 17/3053* (2013.01); *G06F 17/30864* (2013.01); *G06F 17/30876* (2013.01); *G06F 21/60* (2013.01)

(58) Field of Classification Search
CPC ............ G06F 17/2235; G06F 17/3053; G06F 17/30864; G06F 17/30876; G06F 21/10; G06F 21/60; G06F 17/30849; G06F 17/30861; H04L 63/1416
USPC ................................... 726/26–30; 705/50–59
See application file for complete search history.

(56) References Cited

U.S. PATENT DOCUMENTS

| | | | |
|---|---|---|---|
| 5,754,864 A | 5/1998 | Hill | |
| 8,037,506 B2 | 10/2011 | Cooper et al. | |
| 8,489,560 B1 * | 7/2013 | Conroy | 707/691 |
| 8,666,965 B2 * | 3/2014 | Bennett | 707/709 |

(Continued)

OTHER PUBLICATIONS

Mishra, et al., Strategic Analysis of Corporate Software Piracy Prevention and Detection. Journal of Organizational Computing and Electronic Commerce. Abstract only. vol. 15, Issue 3, 2005. DOI: 10.1207/s15327744joce1503_3.

*Primary Examiner* — Nirav B Patel
(74) *Attorney, Agent, or Firm* — DeLio, Peterson & Curcio LLC; Kelly M. Nowak

(57) ABSTRACT

A computer identifies and ranks URL hyperlinks to possible pirated media content by searching a web page from a first website for one or more indicator keywords, wherein a strength of an indicator keyword is related to a likelihood of pirated media content. Responsive to locating a plurality of instances of the one or more indicator keywords, identifying a plurality of hyperlinks respectively associated with one or more of the plurality of instances. Weighting, the identified plurality of hyperlinks based on at least one of: a strength of associated indicator keywords, number of associated indicator keywords, number of times each hyperlink was identified, and date of posting. Ranking the plurality of hyperlinks according to weight indicating a relative likelihood that respective hyperlinks point to pirated media content in a ranked list.

18 Claims, 13 Drawing Sheets

(56) References Cited

U.S. PATENT DOCUMENTS

| | | | |
|---|---|---|---|
| 8,713,010 B1* | 4/2014 | Trevelyan | 707/735 |
| 2001/0041989 A1 | 11/2001 | Vilcauskas, Jr. et al. | |
| 2002/0078230 A1* | 6/2002 | Hals et al. | 709/238 |
| 2006/0048237 A1 | 3/2006 | Luo et al. | |
| 2007/0282749 A1 | 12/2007 | Nonaka et al. | |
| 2014/0215569 A1* | 7/2014 | Sugaya | 726/4 |
| 2015/0058998 A1* | 2/2015 | Yu et al. | 726/26 |

* cited by examiner

Sample Snippets with URL to pirated video content

502
- Stanford vs USC live http://sportsbuzzz.com/ncaa-tv/
  *Strong Match Info   Weak Match Info       Extended URL*
- http://www.gamebabies.com/mississippi-vs-kentucky-games-online-free
  live-stream-college-football-ncaa-how-to-watch-on-pc
  *                    Extended URL*
- NHL live free at www.youtube.com/freegame
  *Strong Positive Clue      Extended URL*
- Villanova Wildcats vs. South Florida Bulls CLICK HERE TO WATCH IT
  *          Strong Match Info                  Weak Match Info*
  LIVE NOW! http://bit.ly/i8wdT3
  *          Extended URL*

Sample snippets that looks similar to the ones above

504
- Get your credit report for free at www.freecreditreport.com
  *       Strong Negative Clue  Weak Match Info    Extended URL*
- Live streaming at www.yoursfree.com of latest Gaga album
  *Positive Match Info    Extended URL            Strong Negative Clue*
- Download live streaming software for free: www.freesoftware.com
  *Weak Negative Clue Strong Positive Clue   Weak Match Info   Extended URL*
  *                 Strong Negative Clue*

| 802 | 804 | 806 | |
|---|---|---|---|
| RANK | WEBSITE | # OF URL HYPERLINKS | |
| 1 | atdhe.net | 1925 | |
| 2 | ur1.ca | 465 | |
| 3 | atdhenet.tv | 372 | |
| 4 | firstrowsports.eu | 362 | |
| 5 | firstrow.net | 286 | |
| 6 | pjfleckcamp.com | 215 | |
| 7 | abcdgrowth.com | 208 | |
| 8 | soccertvlive.net | 193 | 808 |
| 9 | rootzoo.com | 154 | |
| 10 | youtube.com | 153 | |
| 11 | hostfire.us | 123 | |
| 12 | entrancemagazine.com | 106 | THRESHOLD = 100 |
| 13 | mix-tv-sport.com | 96 | |
| 14 | amplify.com | 94 | |
| 15 | bit.ly | 88 | |
| 16 | frontrangenews.com | 86 | |
| 17 | espn.livepcsports.com | 87 | |
| 18 | ftonews.com | 86 | |
| 19 | secure.sighnup.way.com | 79 | |
| 20 | emaxalive.com | 79 | |

FIG. 8

IDENTIFYING AND RANKING PIRATED MEDIA CONTENT

FIELD OF THE INVENTION

The present invention relates generally to media sharing, and more particularly, to monitoring the sharing of particular media content.

BACKGROUND OF THE INVENTION

Piracy of media content has been occurring for decades and with the ever changing landscape of technology, pirated media content can be brought to a user in various ways. Media content, for example, can include movies, television shows, music, and sporting events. Media content can be pirated and shared, for example, through file sharing websites, torrent websites, and content streaming websites. Certain content streaming websites pose a greater issue for the owner of media content due to the volume of visitors each web site is capable of handling. For example, if a single user is hosting a pirated media content stream, the number of users that can access the content is limited by the hosting platform. However, if there is a more established platform hosting a pirated media content stream, where multiple servers can host the pirated media content stream, more users can access the pirated media content stream.

Access to the pirated media content is often discussed on various websites (i.e., Facebook® and Twitter®) and knowledge of this pirated media content is shared with others so it can be accessed. Additionally, access to pirated media content may be provided by a URL link to the said pirated media content on the various websites.

SUMMARY

Embodiments of the present invention disclose a method, computer program product and computer system for identifying and ranking URL hyperlinks to possible pirated media content. A computer searching a web page from a first website for one or more indicator keywords, wherein a strength of an indicator keyword is related to a likelihood of pirated media content. Responsive to locating a plurality of instances of the one or more indicator keywords, the computer identifying a plurality of hyperlinks respectively associated with one or more of the plurality of instances. The computer weighting the identified plurality of hyperlinks based on at least one of: a strength of associated indicator keywords, number of associated indicator keywords, number of times each hyperlink was identified, and date of posting. The computer ranking the plurality of hyperlinks according to weight indicating a relative likelihood that respective hyperlinks point to pirated media content in a ranked list.

BRIEF DESCRIPTION OF THE SEVERAL VIEWS OF THE DRAWINGS

FIG. 5 contains an example of strong and weak indicator keywords, along with the extended URL hyperlinks, that may be identified by a piracy sorting program capable of identifying and ranking potential links to pirated media content, in accordance with an embodiment of the present invention.

FIG. 6 illustrates example excerpts in the text of a web page that may be scanned by the piracy sorting program, in accordance with an embodiment of the present invention.

FIG. 7A is an example of a recorded annotation by the piracy sorting program, in accordance with an embodiment of the present invention.

FIG. 7B is a continuation of the example recorded annotation by the piracy sorting program 112 in FIG. 7A, in accordance with an embodiment of the present invention.

FIG. 8 is an example of a website list and ranking created by the piracy sorting program subsequent to an examination of websites, in accordance with an embodiment of the present invention.

DETAILED DESCRIPTION

Figure 1:
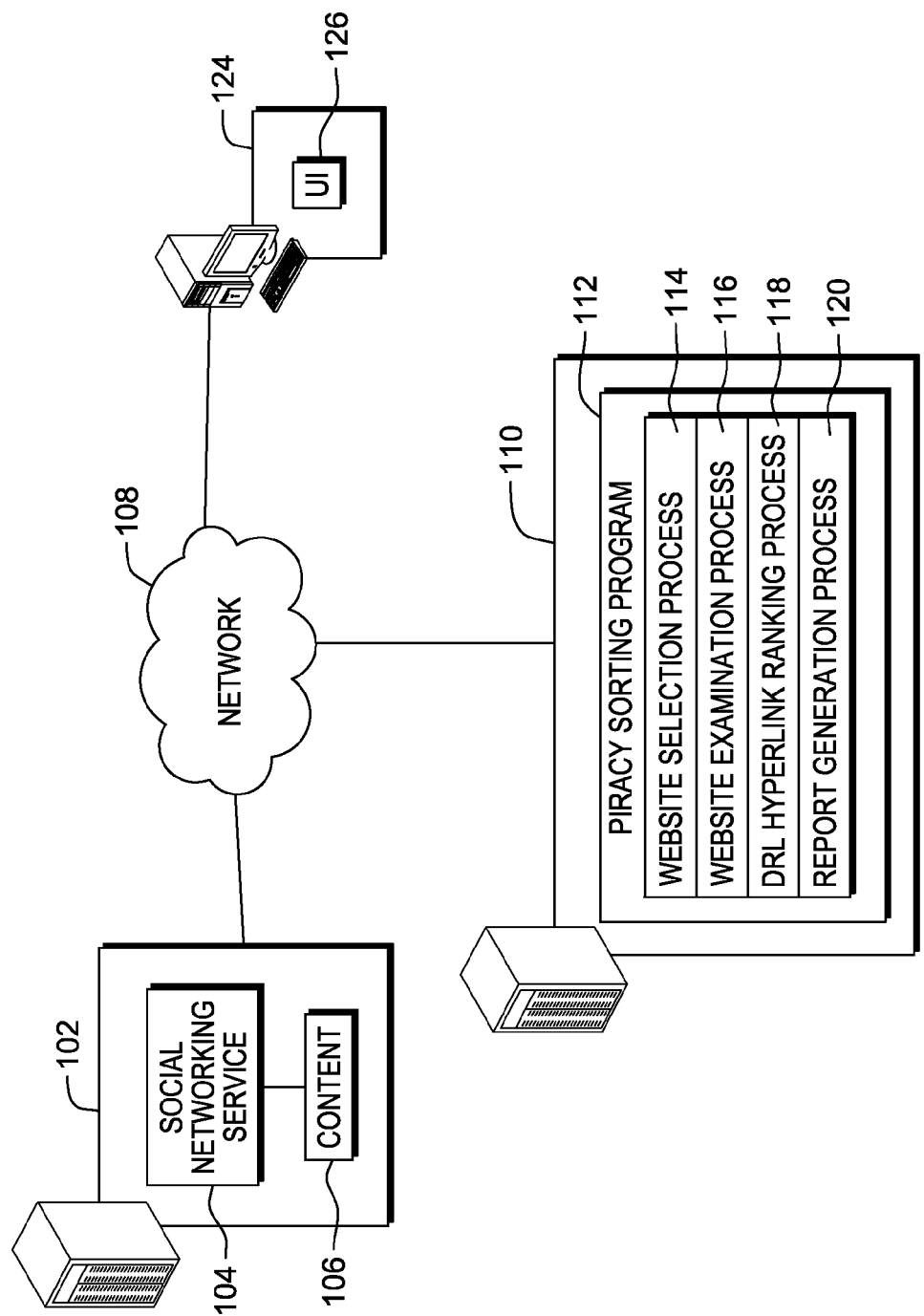
FIG. 1 is a functional block diagram illustrating a distributed data processing environment, in accordance with an embodiment of the present invention.

Remedies exist for copyright holders against those who would illegally provide access to copyrighted media content. Discovering pirated media content, however, can be difficult. Often, websites hosting and/or providing access to pirated media content allow many users to post content, much of which is legal. Additionally, those posting pirated media content often provide titles and labels that do not convey the nature of the content. For these reasons, determining legal media content from illegal pirated media content is impractical for many such websites, though they do typically agree to remove content if notified of illegality.

With social networking websites allowing users to interact with one another, information is regularly exchanged among the users. Embodiments of the present invention recognize that analysis of social networking websites may identify pirated media content hosted by another website. Though established social networking websites do not typically host pirated media content, users may discuss pirated media content and provide URL hyperlinks to such content. Of course, not all URL hyperlinks provided in a social networking website direct users to pirated media content. Embodiments of the present invention further provide a ranking of discovered hyperlinks based on which have the greatest potential of containing pirated media content, thereby allowing a user of the present invention to quickly identify hyperlinks with a high probability of directing users to pirated media content. Another embodiment may also allow a user to search for links to specific pirated media content, e.g., a specific movie, a sporting event, etc.

Subsequent to identification and/or ranking, a user may follow up as necessary with the website hosting such content.

Additionally, embodiments of the present invention recognize that analysis of information shared between users may allow for a better understanding of how information, particularly sources of pirated media content, are shared between users.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable media having computer readable program code/instructions embodied thereon.

Any combination of computer-readable media may be utilized. Computer-readable media may be a computer-readable signal medium or a computer-readable storage medium. A computer-readable storage medium may be, for example, but is not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

FIG. 1 is a functional block diagram illustrating a distributed data processing environment, generally designated 100, in accordance with one embodiment of the present invention. Distributed data processing environment 100 includes server computer 102, server computer 110 and computer device 124 interconnected over network 108.

Server computer 102 may be a specialized computer server accessible to multiple client computers via network 108. In certain embodiments, server computer 102 represents a computer system utilizing clustered computers and components that act as a single pool of seamless resources when accessed through network 108, as is common in data centers and with cloud computing applications. In general, server computer 102 is representative of any programmable electronic device or combination of programmable electronic devices capable of executing machine-readable program instructions and communicating with other electronic devices via a network.

Server computer 102 may store, maintain, and provide various services, e.g., social networking service 104, to clients (not shown) of server computer 102. Social networking service 104 facilitates the communication or sharing of information between users of social networking service 104. Social networking service 104 may be, for example, Facebook®, Twitter®, Instagram®, a forum hosting website, a blog hosting website, or any other type of website capable of providing a platform to publicly share information between users. Information shared between users on social networking service 104 is designated herein as content 106. Content 106 may be a conversation between users, a blog posted by a user, a URL hyperlink posted by a user, or any other type of text relaying information from one user to the next. For discussion purposes, in this embodiment content 106 represents text (i.e., conversation, blog posts, etc.) containing a URL hyperlink embedded therein or a URL hyperlink itself without accompanying text. The URL hyperlinks of focus in content 106 are URL hyperlinks to potential pirated media content such as video streams, music downloads, movie downloads or any other type of licensable media content. However, among the URL hyperlinks of focus in content 106, there exist undesired URL hyperlinks which are not of focus. Such undesired URL hyperlinks in content 106 are URL hyperlinks to spam websites, retail websites, or any website known to have a proper license to the media content being hosted by said website.

In general, network 108 can be any combination of connections and protocols that will support communications between server computer 102, server computer 110 and computer device 124 Network 108 can include, for example, a local area network (LAN), a wide area network (WAN) such as the Internet, a cellular network, or any combination of the preceding, and can further include wired, wireless, and/or fiber optic connections.

Server computer 110 may be a desktop computer, a laptop computer, a tablet computer, a specialized computer server, a smartphone, or any other computer system known in the art. In certain embodiments, server computer 110 represents a computer system utilizing clustered computers and components that act as a single pool of seamless resources when accessed through network 108, as is common in data centers and with cloud computing applications. In general, server computer 110 is representative of any programmable electronic device or combination of programmable electronic devices capable of executing machine-readable program instructions and communicating with other computer devices via a network. In this embodiment, server computer 110 has the ability to communicate with other computer devices to query the computer devices for information.

Piracy sorting program 112 residing in computer server 110 has the ability to examine content 106 to identify keywords and URL hyperlinks, within proximity to said identified keywords, to potential pirated media content. Piracy sorting program 112 may comprise functions such as website selection process 114, website examination process 116, URL hyperlink ranking process 118, and report generation process 120. Website selection process 114 may store, maintain, and provide a list of websites, e.g., social networking service 104, for examination of posted content, e.g., content 106.

Website examination process 116 may examine such content by scanning web pages of each website and identifying keywords and URL hyperlinks within proximity of the identified keywords. Website examination process 116 utilizes a keyword list containing strong and weak indicator words and identifies the keywords from the list used on web pages of each website. Website examination process 116 may utilize a threshold proximity value, established by a user, to gauge whether or not a URL hyperlink is within proximity of a keyword. The threshold proximity value can be, for example, an amount of text between an identified keyword and a URL hyperlink.

URL hyperlink ranking process 118 can rank the identified URL hyperlinks and the examined web pages of each website according to metrics predefined or established by the user. Such metrics can include the number of times the same URL hyperlink has been identified, the average amount of URL hyperlinks identified per web page of each website, and number of strong indicator keywords within proximity of a given URL hyperlink.

Report generation process 120 can provide the results of URL hyperlink ranking process 118 to a user in a visual representation on a local display, or alternatively, to user interface 126 of computer device 124. Report generation process 120 may also allow the user to specify, via an input, what information and how the said results of URL hyperlink ranking process 118 are displayed.

In one embodiment, piracy sorting program 112 may be a web service accessible via network 108 to a user of a separate device, e.g., computer device 124. In another embodiment, piracy sorting program 112 may be operated directly by a user of server computer 110.

User interface 126 on computer device 124, displays information that any one of the processes of piracy sorting program 112 may display to a user. In various embodiments of the present invention, computer device 124 can be a laptop computer, a tablet computer, a netbook computer, a personal computer (PC), a desktop computer, a personal digital assistant (PDA), a smartphone, or any programmable electronic device capable of communicating with server computer 102 and server computer 110 via network 108. User interface 126 can be, for example, a graphical user interface (GUI) or a web user interface (WUI) and can display text, documents, web browser windows, user options, application interfaces and instructions for operation.

Figure 2:
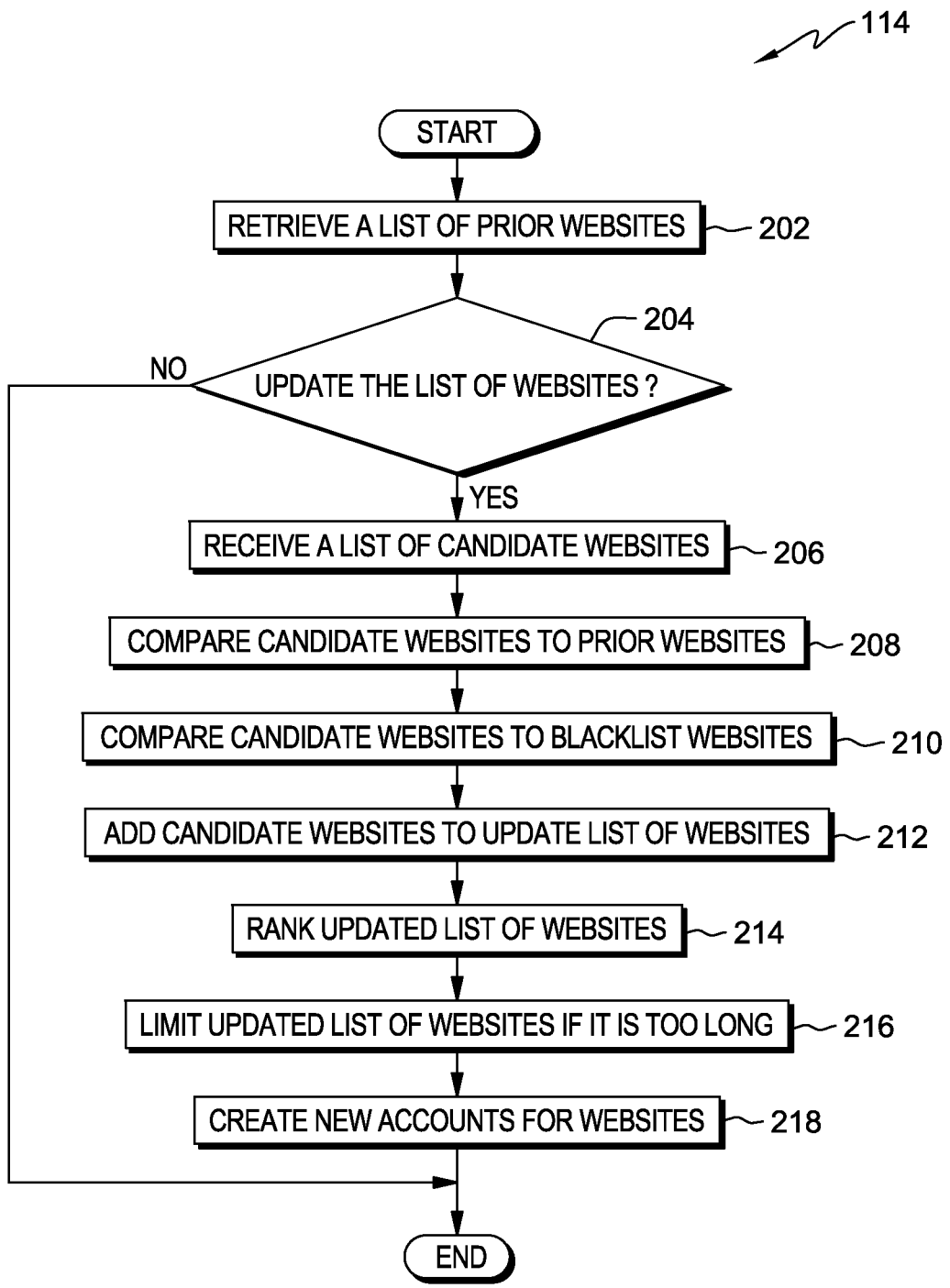
FIG. 2 is a flowchart depicting operational steps for a website selection process for maintaining a website list, in accordance with an embodiment of the present invention.

FIG. 2 is a flowchart depicting operational steps for website selection process 114 for maintaining a website list, in accordance with an embodiment of the present invention.

Prior to piracy sorting program 112 scanning a website for URL hyperlinks to potential pirated media content, website selection process 114 of piracy sorting program 112 may establish a list of websites to examine. Website selection process 114 can use an initial list of websites as a basis of websites to scan for URL hyperlinks to potential pirated media content. The initial list of websites may be a final list of websites from a previous iteration of website selection process 114, and ultimately may be comprised of known websites where users may publicly share information and post hyperlinks. In a first instance, the initial list may be predefined by a designer, administrator, or user of an embodiment of the present invention. In another embodiment, the list may be empty in a first instance.

In one embodiment, website selection process 114 begins by retrieving a prior list of websites (step 202), should one exist. The initial list selected may vary depending on a type of pirated media content being searched for. For example, if website selection process 114 focuses on identifying URL hyperlinks to potential pirated media content relating to sports, an initial list of websites can be selected that correlates to sports. Furthermore, an initial list of websites can correlate to a specific sport or sporting event. Such websites can include, for example, discussion forums where previous or future sporting events are discussed, blog posting websites where users discuss past or future sporting events, or particular social media websites where certain sports teams can have dedicated web pages.

Website selection process 114 may determine whether the list should be updated (decision 204). For example, website selection process 114 may perform an update after a specified number of times being executed, after a specified duration of time has passed, or may query and receive input from a user. If website selection process 114 determines not to update the list with new websites (no branch, decision 204), piracy sorting program 112 can proceed with operational steps discussed in further detail pertaining to FIGS. 3 and 4. If website selection process 114 determines to update the prior list with new websites (yes branch, decision 204), website selection process 114 proceeds to step 206.

Website selection process 114 may receive a list of candidate websites with which to update the prior list of websites (step 206). In one embodiment, website selection process 114 can receive the list of candidate websites from a user via user interface 124. The user can, for example, independently compile a list of candidate websites that have the potential of providing links to pirated content, and input the list into website selection process 114. In another embodiment, website selection process 114 can utilize an Internet search engine to query the Internet for relevant social networking websites. In one implementation, the search for relevant websites may be as simple as a query for "social networking sites". Website selection process 114 can then pull website addresses for all returned results, or for a specified number of the top returned results and use the web site as candidates for updating the list.

Website selection process 114 compares the list of candidate websites to the list of prior websites (step 208). Website selection process 114 can analyze each of the candidate websites in succession to determine if the candidate website is already on the prior list of websites. Duplicate websites may be ignored. If there is a candidate website not on the prior list of websites, website selection process 114 may determine to update the prior list with the candidate website.

Website selection process 114 may also compare the list of candidate websites to a blacklist of websites (step 210). The blacklist of websites may contain a list of websites that should not be searched by piracy sorting program 112. For example, blacklist websites may be websites which are known to produce an insufficient amount of hyperlinks to potential pirated media content. In one embodiment, a user may make a determination that a specific website should not be searched by piracy sorting program 112 and may enter it on a list of such websites. In another embodiment, website selection process 114 may determine websites that are of lesser search value. For example, website selection process 114 may determine whether a website has met a threshold number of hyperlinks. In another example, website selection process 114 may determine whether a website has met a threshold number of relevant keywords. Piracy sorting program 112 may place such websites on a blacklist, or, preferably, present the information to a user and allow the user to make the determination.

Website selection process 114 updates the list of websites with the candidate websites not duplicative or on a blacklist (step 212). Though website selection process 114 can ensure that no duplicate websites are entered into the list, website selection process 114 can use such information when prioritizing examination of listed websites. For example, website selection process 114 can count websites that have been entered as a candidate website more than once and deem a priority examination of a website that has been repeatedly mentioned as a candidate for updating the list.

In one embodiment, website selection process 114 ranks the updated list of websites (step 214). The rank of the updated list of websites may determine the priority piracy sorting program 112 takes in examining each of the websites from the updated list of websites. A website ranking higher in the list may have the potential of containing more hyperlinks to potential pirated media content than a ranking lower in the list. In one embodiment, ranking of each website can take into account known historical data of a website, should such data exist. Additionally, as previously discussed, a ranking process may also consider multiple determinations of the website as a candidate website.

Website selection process 114 may, in one embodiment, limit the amount of websites if the updated list of websites is too large or if the website's rank is too low (step 216). The user can direct website selection process 114 to limit the amount of websites examined by selecting certain websites to examine if the list of websites is too large. In one embodiment, the selection of websites can be done according to a timeline of the websites which have gone the longest without an examination by piracy sorting program 112. For a website that has been examined recently, website selection process 114 can deem the website a lower priority by not examining the website until a later time. The user can select the duration a website can go unexamined. In another embodiment, the selection of websites can be done according to relevant re-occurring events on a given day, week, or month of the year. For example, if piracy sorting program 112 is examining websites for hyperlinks to potential pirated media content pertaining to baseball, piracy sorting program 112 can selectively examine websites dedicated to discussion of baseball during the baseball season. However, if the baseball season has ended, piracy sorting program 112 can cease the examination of websites dedicated to discussion of baseball until the next season begins. Typically, the potential of hyperlinks to potential pirated media content being discussed is greater when there is new media content being introduced more frequently.

In another embodiment, website selection process 114 can have an established threshold that limits the examination of a website if said website ranks too low. As previously discussed, website selection process 114 can rank a website based on the average amount of hyperlinks per web page of a website. The established threshold can limit the websites that website selection process 114 examines, by not examining websites which rank too low.

Website selection process 114 creates new accounts for websites (step 218). Certain websites on the list of websites may not have publically available web pages for website selection process 114 to examine. Such non-publically available web pages may need an account to view the content and in such instances, website selection process 114 can, in one embodiment, create user accounts on the websites to view the web pages. For example, when a website requires an account, website selection process 114 may query a user for a username and password combination of an existing account, may inform the user to manually create an account and subsequently enter a username and password combination, or may attempt to automatically create an account. Because many websites actively take measures to prevent automated programs from creating accounts, seeking user participation may be preferred.

Figure 3:
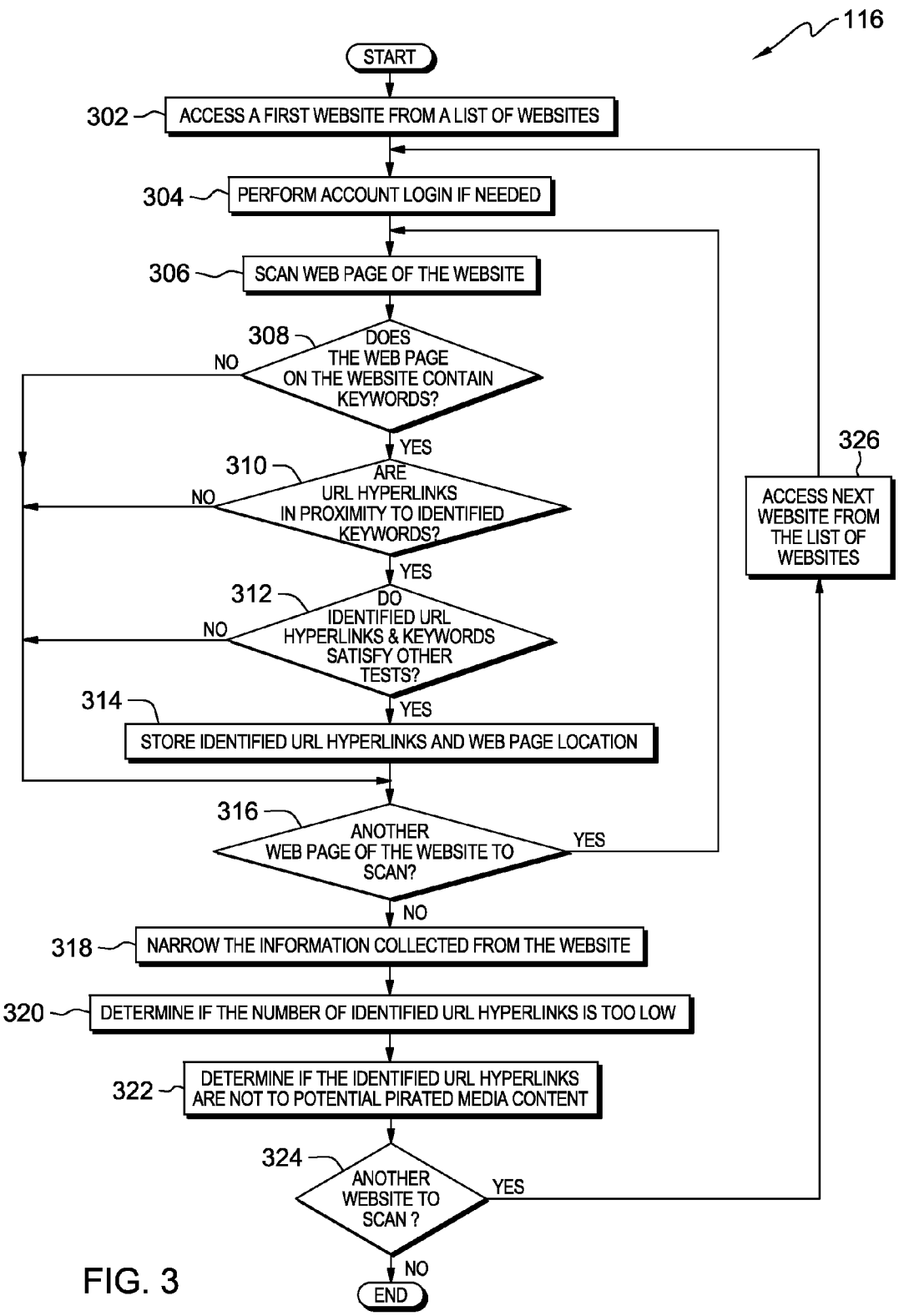
FIG. 3 is a flowchart depicting operational steps of website examination process for identifying hyperlinks to potential pirated media content, in accordance with an embodiment of the present invention.

During the examination of each website, when website selection process 114 is prompted for a username and password combination, website selection process 114 can access stored username and password combinations and successively enter each combination. In the event website selection process 114 gains access to the website due to a certain username and password combination, website selections process 114 can tag that combination to be used for future examinations. In the event website selection process 114 fails to gain access to the website with the stored username and password combinations, website selections process 114 can tag the website as inaccessible. Upon which, a user can then manually create an account with a username and password for the website and website selections process 114 can store the information for future examinations. In one embodiment, sites tagged as inaccessible can be put on the blacklist FIG. 3 is a flowchart depicting operational steps of website examination process 116 for identifying hyperlinks to potential pirated media content, in accordance with an embodiment of the present invention.

Website examination process 116 accesses a website from the list of websites (step 302). Website examination process 116 refers to the list of websites to obtain a URL address of the first website. In an embodiment where the websites on the website list are ranked, website examination process 116 may select the website ranked highest on the list. Website examination process 116 may access the first website using the URL address. Any websites that website examination process 116 cannot access website examination process 116 may flag and notify the user.

Website examination process 116 performs an account log in if needed (step 304). If website examination process 116 is in the process of accessing a website and web page access is denied, website examination process 116 can detect if an account login window is prompted. The prompting of a window where a username and password combination is needed causes website examination process 116 to access a stored username and password combination associated with the website, or to query the user for the information.

Website examination process 116 scans a web page of the website (step 306). Website examination process 116 scans the textual content of the first web page for keywords which may serve as an indication that pirated media content is being discussed. In one embodiment, the list of keywords can be split into two categories to better identify and classify different types of keywords to potential pirated media content. The first category may contain keywords that are a strong indication of potential pirated media content. The second category may contain keywords that are a weak indication of potential pirated media content. In various embodiments, keywords may be directed both to identifying specific types of media content and to indications that media content pointed to by a link is pirated.

Keywords that are strong indicators may be words specifically targeting discussion related to a specific type of media content or of a specific topic or event. In an example, if website examination process 116 is scanning for hyperlinks to a video file or live stream of the Super Bowl, strong indicator keywords may be the name of the two teams playing, names of players on the two teams playing, and the date of when the Super Bowl is being played. Such strong indicator keywords can assist piracy sorting program 112 in ranking potential pirated media content. Keywords that may still be useful but are weak indicators may be, using the example from above, any team other than the two teams playing in the Super Bowl, the names of players not playing, or dates of previous Super Bowls.

Continuing with the above example, keywords indicative of potential piracy may include "watch", "live", and "free". Keyword combinations may also be used, for example, "Watch live Super Bowl", "Watch live on Sunday", or "Link to watch Super Bowl live". Such keywords and combinations may have a strong potential of containing discussion of pirated media content, and as such, could be placed in the strong indicator category. Weak indicator keyword combinations could include, "Watch live on CBS", "Watch Pre-Game", "Buy ticket to Super Bowl" or "Pay-Per-View Super Bowl". Such combinations of weak indicator keywords have a weak potential containing discussions of pirated media content. It is to be noted that indicator strength of a strong indicator keyword (e.g., "watch") may be reduced if found in association with a weak indicator keyword, i.e. a keyword combination (e.g., "watch pre-game").

Website examination process 116 determines if the first web page of the website contains keywords (decision 308). If website examination process 116 determines there are no keywords on the first web page of the website (no branch decision 308), website examination process 116 determines if there is another web page of the website to scan (decision 316). If there is another web page, website examination process 116 returns to step 306.

If website examination process 116 determines there are keywords on the first web page of the website (yes branch, decision 308), website examination process 116 determines if there are URL hyperlinks in proximity to the identified keywords on the web page of the website (decision 310). If website examination process 116 determines there are no URL hyperlinks in proximity to the identified keywords on the web page of the website (no branch, decision 310), website examination process 116 determines if there is another web page of the website to scan (decision 316). If website examination process 116 determines there are URL hyperlinks in proximity to the identified keywords on the web page of the website (yes branch, decision 310), proceeds with further threshold tests.

URL hyperlinks in proximity of identified keywords can signal the URL hyperlink is to potential pirated media content. In one embodiment, website examination process 116 determines whether a hyperlink is in proximity to keywords based on a number of words between the URL hyperlink and the keywords. A threshold number of words may be pre-defined by a user. If the threshold is exceeded, website examination process 116 may determine that the URL link is not associated with the identified keyword. In another embodiment, distinct segments on a web page may be detected, e.g., by headings, by identified poster, etc., in such an embodiment, website examination process 116 may determine that a hyperlink is in proximity to identified keywords if found within the same distinct segment.

Website examination process 116 determines if the identified keywords and associated URL hyperlinks satisfy other threshold tests (decision 312). If website examination process 116 determines the identified keywords and associated URL hyperlinks do not satisfy other threshold tests (no branch, decision 312), website examination process 116 determines if there is another web page of the website to scan (decision 316). If website examination process 116 determines the identified keywords and associated URL hyperlinks do satisfy other threshold tests (yes branch, decision 312), website examination process 116 can proceed to step 314.

An example of a threshold test may be website examination process 116 determining whether the ratio of strong indicator keywords identified to weak indicator keywords exceeds a pre-established threshold. The threshold can be established prior to website examination process 116 scanning the first web page of the website. If website examination process 116 determines the ratio is above the threshold, website examination process 116 can deem the web page of the website to contain URL hyperlinks to potential pirated media content that is within the scope of the examination. If the website examination process 116 determines the ratio falls below the threshold, website examination process 116 can deem the web page of the website to contain URL hyperlinks to potential pirated media content that is outside the scope of the examination or it can deem the web page of the website to contain URL hyperlinks that are less likely to be to potential pirated media content.

Another threshold test may be determining whether a URL hyperlink meets a certain ranking in the list of identified URL hyperlinks. Ranking of hyperlinks may be an independent process and useful for a number of reasons other than a threshold test. An exemplary implementation for ranking URL hyperlinks on a website is described subsequently with regard to FIG. 4.

Website examination process 116 stores the identified URL hyperlinks as well as the website on which the URL hyperlinks have been identified (step 314). In one embodiment, piracy sorting program 112 can maintain a repository containing a list of all the identified URL hyperlinks as well as the website on which the URL hyperlink has been identified. Website examination process 116 can organize the repository such that every time a new URL hyperlink has been identified, piracy sorting program 112 updates the repository with the newly identified URL hyperlink. Since a URL hyperlink can direct a user to a specific web page of a website where there may be pirated media content, both the extended URL hyperlink may be stored along with primary URL hyperlink of the website (i.e., home page). The information collected from the first website can include the primary URL hyperlink, the extended URL hyperlink, an amount of weak and strong indicator keywords associated with every identified URL hyperlink, a website where the URL hyperlink was identified and a web page of the website where the URL hyperlink was identified.

Website examination process 116 determines if there is another web page of the website to scan (decision 316). Website examination process 116 can access all web pages available on each web site or particular pre-determined web pages of each website. If examination process 116 determines there is another web page of the website to scan (yes branch, decision 316), website examination process 116 reverts back to step 306 to scan another web page of the website.

If website examination process 116 determines there is no other web page of the website to scan (no branch, decision 316), website examination process 116 narrows the information collected from the website according to established rules (step 318). More specifically, website examination process 116 can filter the list of identified hyperlinks, removing from the list excessive hyperlinks. In one embodiment, website examination process 116 determines whether there have been too many identified URL hyperlinks from the website. Too many hyperlinks can be difficult to manage and hard to work with, and in one embodiment, website examination process 116 provides the ability to truncate the list. In one embodiment, website examination process 116 may remove links that have been identified the fewest amount of times. Hyperlinks identified on multiple occasions on a website are more popular and pose a greater threat, while a hyperlink identified once may pose a smaller threat of providing potential pirated media content to a larger audience. If the list of identified hyperlinks is beyond a threshold number, website examination process 116 may reduce the list to the threshold number, starting first with those identified the least amount of times. In another embodiment, the list may rank according to various processes (see discussion of FIG. 4), and the lowest ranked hyperlinks may be removed.

Website examination process 116 may also determine if the number of identified URL hyperlinks is too low (step 320). In the event the number of identified hyperlinks falls below a threshold number, website examination process 116 can remove the website from the list of future scans for URL hyperlinks.

Website examination process 116 may also determine whether the identified URL hyperlinks on the website are known to not contain potential pirated media content (step 322). Website examination process 116 can contain a repository of media content providers known to provide media content not deemed pirated. The repository can be maintained by an administrative user and updated regularly with websites providing media content with proper consent (e.g., NBC.com, Hulu.com, etc.). Website examination process 116 can cross reference the repository to the identified URL hyperlinks of the website to determine if any of the identified URL hyperlinks are known to be providing media content with proper consent. If an identified URL hyperlink is not on the repository list, website examination process 116 deems the URL hyperlink as providing potential pirated media content. If an identified URL hyperlink is on the repository, website examination process 116 may determine that the probability is low that the URL hyperlink points to pirated media content and, in one embodiment, may be removed from the list of identified potential pirated media content.

Website examination process 116 determines whether there is another web site to scan (decision 324). Website examination process 116 refers back to the list of websites to obtain a URL address of websites which have yet to be scanned for examination. In the event there is no other website to scan (no branch, decision 324), website examination process 116 ends the examination of websites for URL hyperlinks to potential pirated media content. In the event there is another website to scan (yes branch, decision 324), website examination process 116 accesses the next website to be scanned for examination (step 326). In this embodiment, website examination process 116 continues with the examination of website as long as there is another website which has yet to be scanned. In another embodiment, website examination process 116 can continuously examine each website one after the other regardless of whether the website has been scanned. Once website examination process 116 accesses the next website yet to have been scanned for examination in step 326, website examination process 116 reverts back to step 304 and performs account log in if needed.

Figure 4:
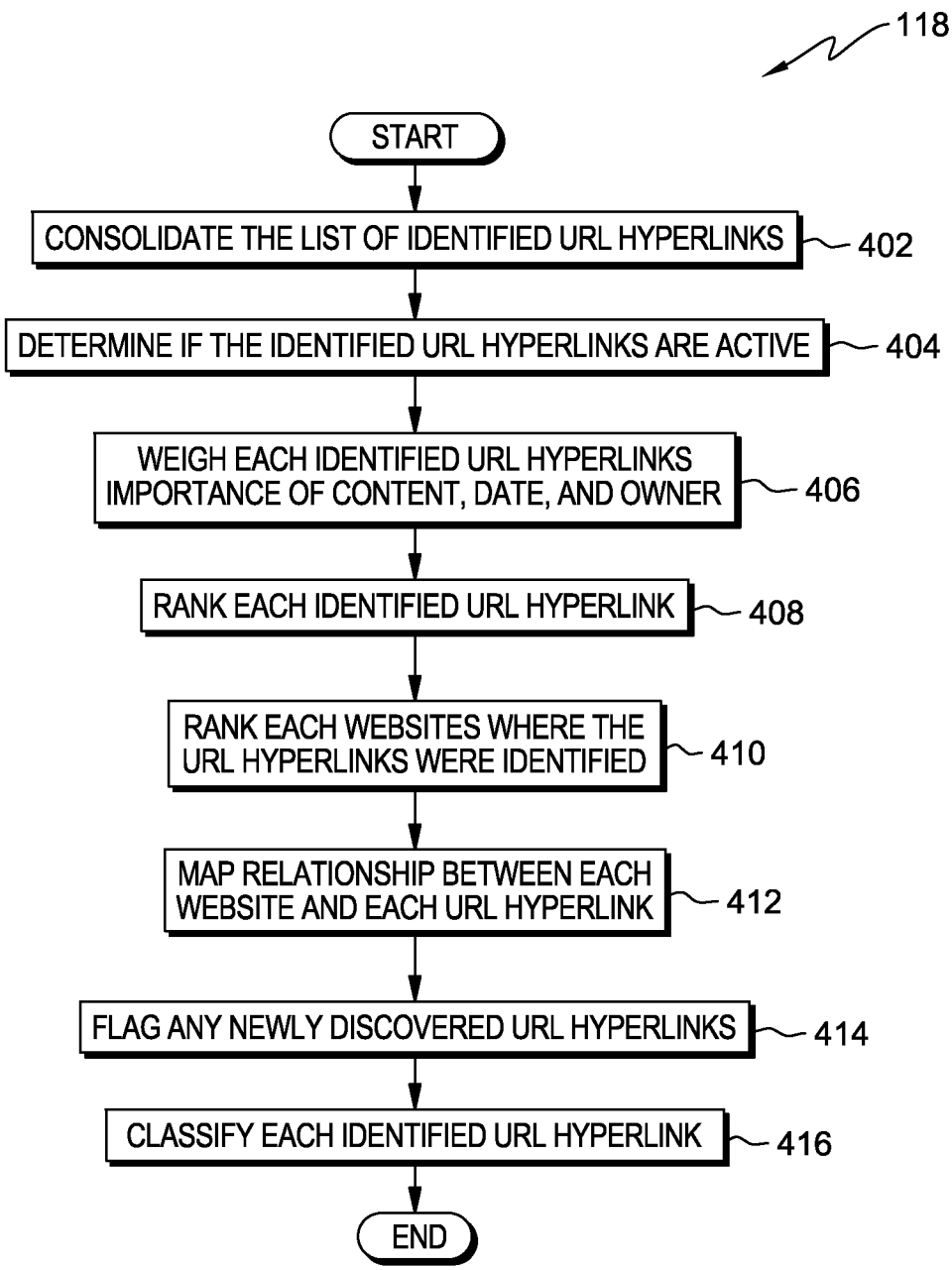
FIG. 4 is a flowchart depicting operational steps of a URL hyperlink ranking process for ranking URL hyperlinks, in accordance with an embodiment of the present invention.

FIG. 4 is a flowchart depicting operational steps of URL hyperlink ranking process 118 for ranking URL hyperlinks, in accordance with an embodiment of the present invention.

URL hyperlink ranking process 118 consolidates the list of identified URL hyperlinks (step 402). In one embodiment, URL hyperlink ranking process 118 can consolidate the list of identified URL hyperlinks by identifying and extracting the primary URL hyperlink from each extended URL hyperlink. URL hyperlink ranking process 118 determines which part of the extended URL hyperlink is of the primary URL hyperlink by identifying the location of the domain name. All of the characters subsequent to the domain name may be deemed a part of the extended URL hyperlink. URL hyperlink ranking process 118 can consolidate the extended URL hyperlinks to primary URL hyperlinks and can determine the amount of times an extended URL hyperlink has been identified and consolidated to a specific primary URL hyperlink.

URL hyperlink ranking process 118 determines whether the identified URL hyperlinks are active (step 404). In one embodiment, URL hyperlink ranking process 118 can access each of the identified URL hyperlinks to see if the website to which the identified URL hyperlink is directing a user is active. URL hyperlink ranking process 118 can access the web page through the identified URL hyperlink and wait to see if the server hosting the identified URL hyperlink is able to produce a web page. If URL hyperlink ranking process 118 determines the identified URL hyperlink is unable to produce a web page, URL hyperlink ranking process 118 can deem the identified URL hyperlink as inactive. If a URL hyperlink is deemed inactive, URL hyperlink ranking process 118 can prompt the user to select whether or not website selection process 114 should remove the website from the list of websites. If URL hyperlink ranking process 118 determines the identified URL hyperlink is able to produce a web page, URL hyperlink ranking process 118 can deem the identified URL hyperlink as active.

URL hyperlink ranking process 118 weights each identified URL hyperlink according to content, date, and owner (step 406). Utilizing weighting algorithms, weighting each of the identified URL hyperlinks allows for URL hyperlink ranking process 118 to determine which identified URL hyperlink contains the greatest potential for pirated media content. In doing so, URL hyperlink ranking process 118 can organize and produce information to a user according to the scope of which the user is using piracy sorting program 112. URL hyperlink ranking process 118 can weight the importance of content in each of the URL hyperlinks by using a ratio of the number of strong indicator keywords to the number of weak indicator keywords to rank each URL hyperlink. For example, if the ratio of strong indicator keywords to weak indicator keywords of a URL hyperlink is great (e.g., over 90%), the URL hyperlink may be weighted heavier due to the potential importance of the content provided by the URL hyperlink. URL hyperlink ranking process 118 can use the ratio of strong indicator keywords to weak indicator keywords to rank the each URL hyperlink according to content importance.

URL hyperlink ranking process 118 can also weight the importance of the date each of the URL hyperlinks was identified. Typically, a recently identified URL hyperlink has a greater likelihood of being relevant than does a hyperlink identified some time in the past. Therefore, the URL hyperlink identified recently would have a greater weight added to it. Furthermore, a URL hyperlink identified both in the past and recently, can be weighted to indicate an even higher likelihood that the URL hyperlink has been providing potential pirated media content for an extended period of time. URL hyperlink ranking process 118 can keep a log of when each of the URL hyperlinks was identified.

URL hyperlink ranking process 118 can weight the importance of ownership of each URL hyperlink by determining how many times a primary URL hyperlink has been identified. URL hyperlink ranking process 118 can identify the primary URL hyperlink as the owner of the extended URL hyperlink since the primary URL hyperlink is acting as a source website for providing extended URL hyperlinks to potential pirated media content. In an embodiment where URL hyperlink ranking process 118 previously consolidated the extended URL hyperlinks to a primary URL hyperlink, the count of each time the same primary URL hyperlink has been extracted can be used as a weight of importance. The more instances the primary URL hyperlink has been extracted, the higher URL hyperlink ranking process 118 weights the URL hyperlink. For example, if a large quantity of extended URL hyperlinks has been consolidated with the extraction of the same primary URL hyperlink, the same primary URL hyperlink can have a greater weight of importance. Typically, the more instances where an extended URL hyperlink has been consolidated to the same primary URL hyperlink implies the primary URL hyperlink is a more established website since all of the extended URL hyperlinks can be traced back to the single primary URL hyperlink.

In one preferred embodiment, the strength of each strong indicator keyword is equal, and the weighting algorithm is based on the number of keywords and their proximity to the URL hyperlink. One skilled in the art would appreciate that different embodiments of the invention would use different combinations of the factors discussed herein in the respective weighting algorithms.

Based on any assessed weights, URL hyperlink ranking process 118 ranks each primary URL hyperlink according to the potential of containing pirated media content (step 408). In one embodiment, weighting preferences can be pre-programmed into piracy sorting program 112 or entered by a user of piracy sorting program 112 prior to execution. The ranking of the URL hyperlinks may be used, as previously discussed, for various threshold tests. Additionally, the rankings may be presented to a user, thereby allowing a user to follow up as necessary, paying attention only to the hyperlinks with the most potential of containing pirated media content. Ranking of URL hyperlinks may occur specific to each website and/or as a ranking of hyperlinks across all searched websites. URL hyperlink ranking process 118 can compile all the ranks for the URL hyperlinks into a ranked list where the higher a URL hyperlink ranks, the higher the relative likelihood the URL hyperlink directs a user to pirated media content.

In one embodiment, URL hyperlink ranking process 118 can additionally utilize the hyperlink rankings to rank each of the websites where URL hyperlinks were previously identified (step 410). In one embodiment, each of the websites can be ranked according to the number of URL hyperlinks provided by the web pages of each website. In another embodiment, each of the websites can be ranked according to an average of the number of URL hyperlinks identified per web page of each of the websites.

URL hyperlink ranking process 118 maps the relationship between each website and each identified URL hyperlink (step 412). Mapping each primary URL hyperlink allows for information as to which websites contained each of the primary URL hyperlinks as well as if the primary URL hyperlink was identified on multiple websites. Mapping each primary URL hyperlink allows for information such as the concentration of where each primary URL hyperlink is identified to determine if the hyperlink is provided in few websites or is more broadly known and posted among a variety of web sites.

URL hyperlink ranking process 118 flags any newly identified URL hyperlinks (step 414). URL hyperlink ranking process 118 can revert back to a list of previously ranked URL hyperlinks to determine if there are any newly identified URL hyperlinks not present on the list. URL hyperlink ranking process 118 can flag such newly identified URL hyperlinks so that the user can look at the list of newly identified URL hyperlinks and determine if any of the URL hyperlinks are to new websites expanding operations with more URL hyperlinks to potential pirated media content.

In one embodiment, URL hyperlink ranking process 118 classifies each identified URL hyperlink (step 416). In one embodiment, URL hyperlink ranking process 118 uses the identified strong and weak keywords to classify each of the identified URL hyperlinks. For example, the identified keywords can indicate a type of sport which is of focus of each of the identified URL hyperlinks. Since the keywords which URL hyperlink ranking process 118 identifies are pre-programmed, the type of sport can be pre-programmed along with each keyword. URL hyperlink ranking process 118 can associate and classify an identified keyword such as "Raiders" with the sport football or piracy sorting program 112 can associate and classify an identified keyword such as "Knicks" with the sport basketball.

URL hyperlink ranking process 118 can also use the identified keyword as an indication of the type of potential pirated media content provided by the URL hyperlink. For example, URL hyperlink ranking process 118 can associate and classify an identified keyword such as "live" or "stream" with a streaming video feed of the media content. In another example, piracy sorting program 112 can associate and classify an identified keyword such as "download" or "uploaded" with media content which can be sourced from an external server and downloaded.

URL hyperlink ranking process 118 can classify each of the identified URL hyperlinks according to the top level domain (e.g., .org, .ch, .com) of each of the URL hyperlinks. Classifying each of the URL hyperlinks to the top level domain allows for a better understanding as to what type of websites are providing potential pirated media content and possibly the server location (i.e., country of origin) of certain URL hyperlinks.

FIG. 5 contains an example of piracy sorting program 112 identifying strong and weak indicator keywords along with the extended URL hyperlinks, in accordance with an embodiment of the present invention.

In this example, piracy sorting program 112 is examining websites to identify URL hyperlinks to potential pirated media content related to sports. As previously discussed, piracy sorting program 112 scans the textual content of the each web page for keywords which may serve as an indication potential pirated media content is being discussed. Piracy sorting program 112 contains a list of such keywords to scan for. Text 502 and 504 contain examples of textual content containing said keywords piracy sorting program 112 scans for. Text 502 contains URL hyperlinks with strong indicator keywords in close proximity or embedded within the URL hyperlinks. For example, piracy sorting program 112 identifies "Stanford vs USC" and "NHL live free" as a match for strong indicator keywords. Piracy sorting program 112 can give the URL hyperlinks in text 502 higher ranks due to the strong keywords being present. Text 504 contains URL hyperlinks with weak keywords in close proximity or embedded therein the hyperlinks. For example, piracy sorting program 112 identifies "credit report" and "album" as a match for weak indicator keywords. The weak indicator keywords implies the URL hyperlinks piracy sorting program 112 has identified have a smaller potential of content pirated media content or a smaller potential of containing content within the scope (i.e., sports related content) of the examination of piracy sorting program 112. Piracy sorting program 112 can archive the URL hyperlinks in text 504.

Figure 6:
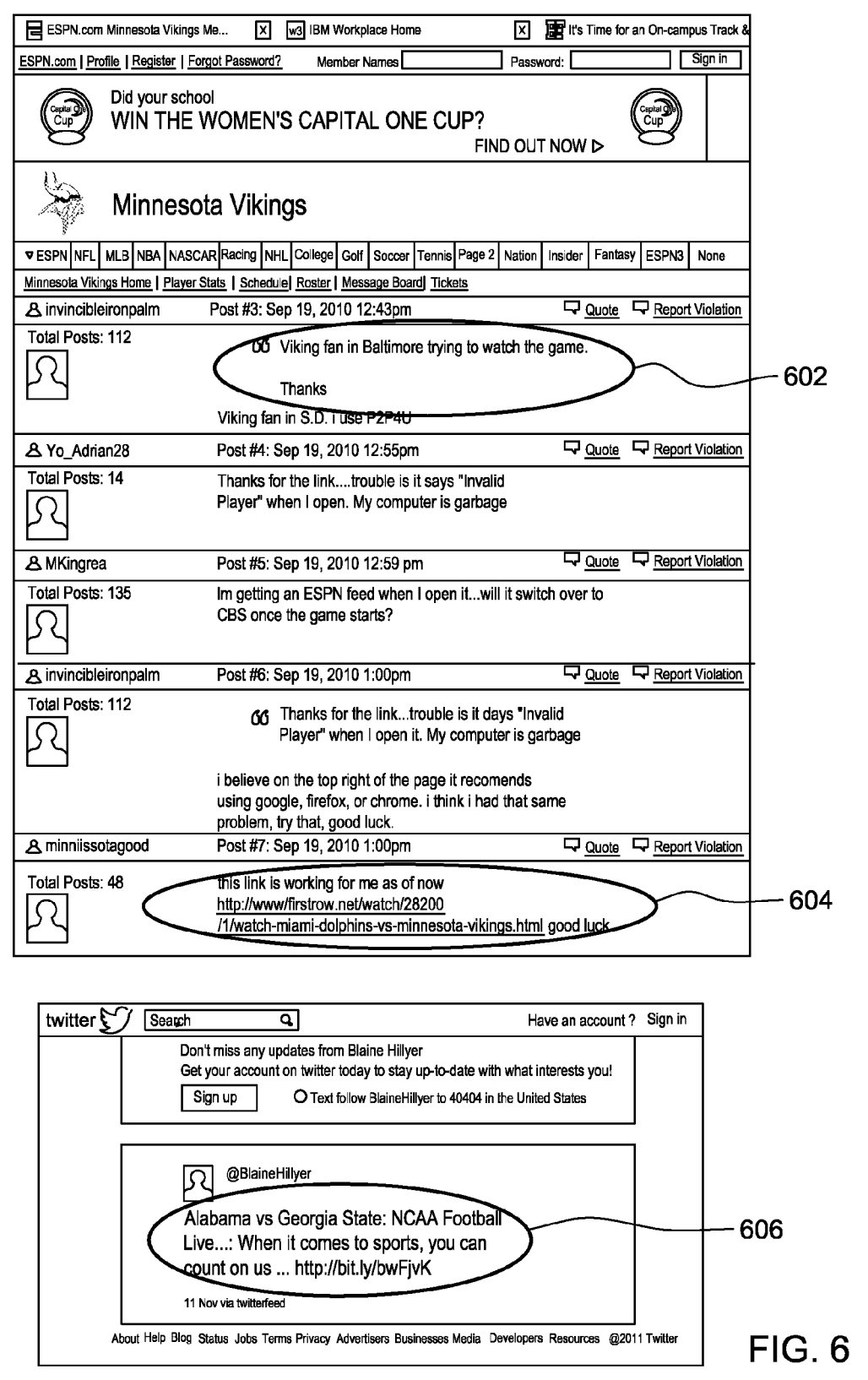

FIG. 6 illustrates example excerpts in the text of a web page that piracy sorting program 112 is scanning, in accordance with an embodiment of the present invention.

The example excerpts, similar to the excerpts discussed in FIG. 5, contain strong and weak indicator keywords along with a corresponding URL hyperlink. In one example, piracy sorting program 112 scans a forum website (i.e., ESPN Message Board) and in excerpts 602 and 604 identifies keywords and corresponding URL hyperlinks with the confines of said excerpts 602 and 604. Examples of keywords in excerpt 602 can be "Viking" and "Baltimore" and examples of keywords in excerpt 604, wherein the keywords are embedded in the URL hyperlink can be "dolphins" and "vikings". In another example, piracy sorting program 112 scans a live status website (i.e., Twitter) and in excerpt 606 identifies keywords and a corresponding URL hyperlink with the confines of said excerpt 606.

Figure 7A:
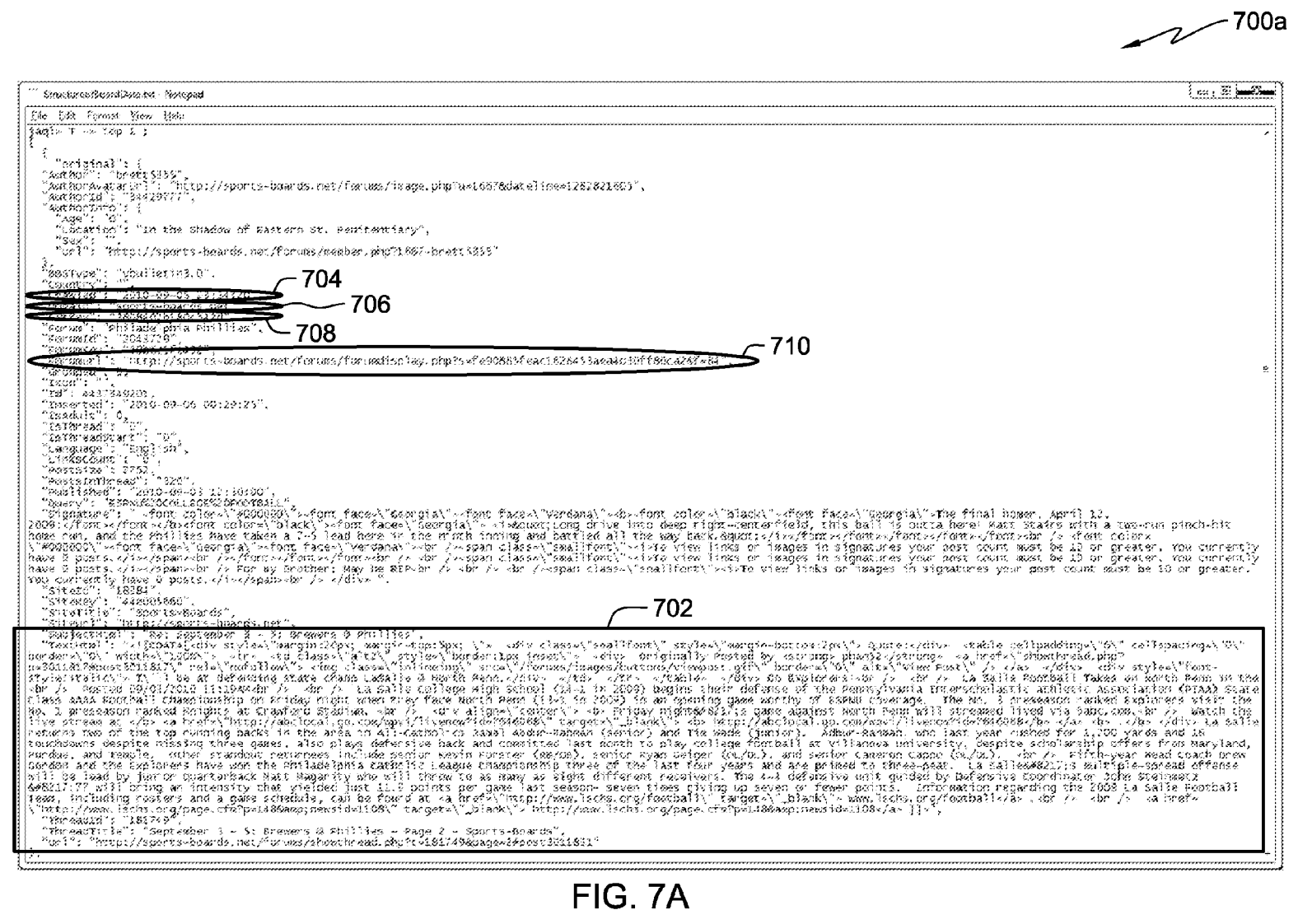

FIG. 7a is an example of a recorded annotation by piracy sorting program 112, in accordance with an embodiment of the present invention.

Recorded annotation 700a is an example of how piracy sorting program 112 collects information while examining a web page of a website. Piracy sorting program 112 scans textual content 702 from a web page of a website to identify any information program if textual content 702 contains any strong or weak indicator keywords. Date 704 represents the time piracy sorting program 112 accessed the web page of the website, domain 706 is the website which was accessed, domain extension 708 is the web page of the website accessed, and domain URL 710 is the complete web page address.

Figure 7B:
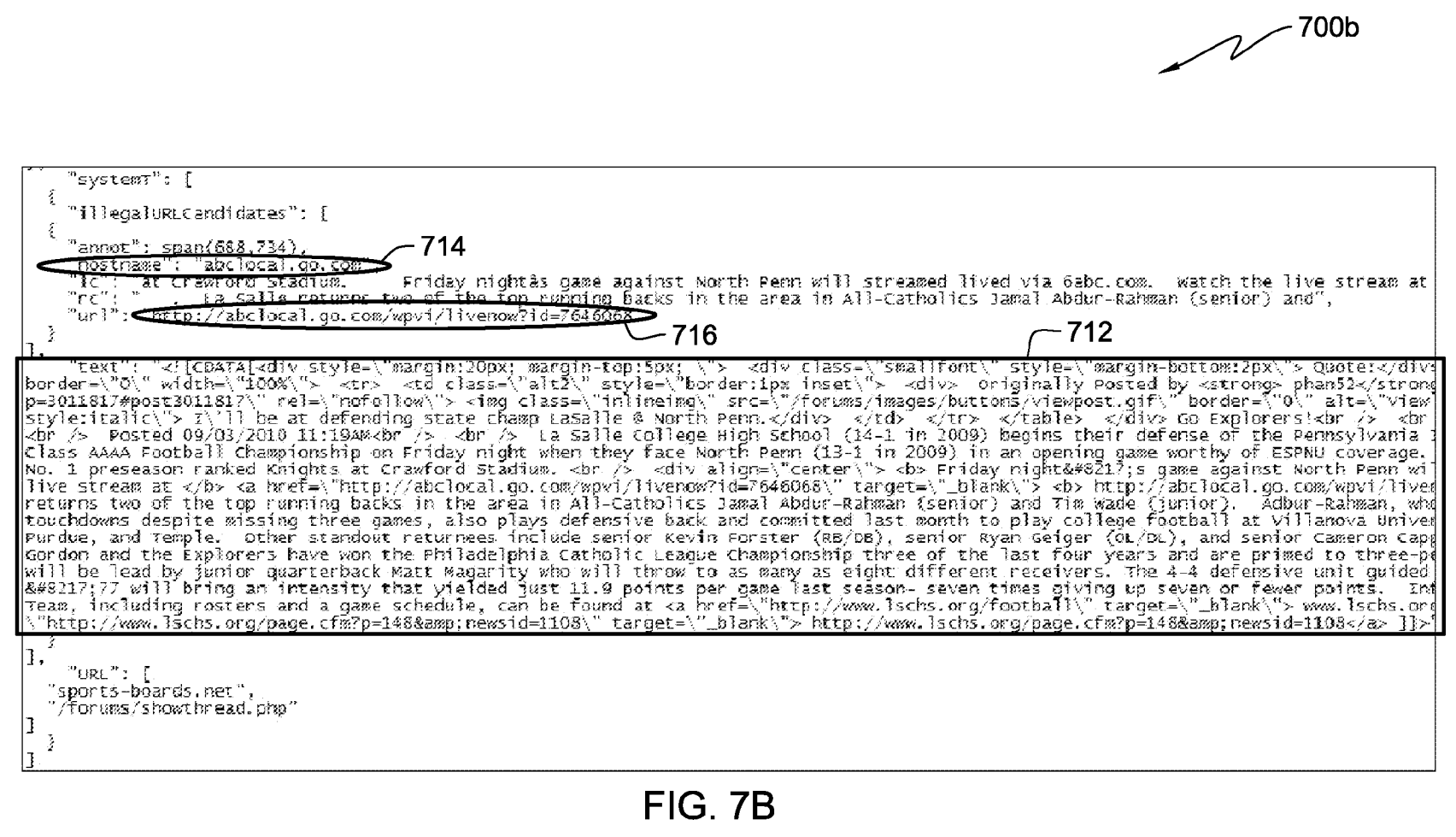

FIG. 7b is a continuation of the example recorded annotation by piracy sorting program 112 in FIG. 7a, in accordance with an embodiment of the present invention.

Recorded annotation 700b is a continuation of the example of how piracy sorting program 112 collects information while examining a web page of a website. Piracy sorting program 112 highlights excerpt 712 in textual content 702 as containing a URL hyperlink to potential pirated media content. The highlighting of excerpt 712 is due in part to the determination by piracy sorting program 112. Excerpt 712 contains weak and/or strong indicator keywords. Piracy sorting program 112 records excerpt 712 along with primary URL hyperlink 714 and identified URL hyperlink 716.

FIG. 8 is an example of how piracy sorting program 112 can display a website list subsequent to an examination, in accordance with an embodiment of the present invention.

Subsequent to piracy sorting program 112 completing an examination, piracy sorting program 112 can present website list 800 to the user. In this example, piracy sorting program 112 presents website list 800 examined in a rank order where the rank of each website correlates to the number of URL hyperlinks identified on the web pages of each of the websites. Column 802 displays the rank of the website examined, column 804 displays the websites examined, and column 806 displays the number of URL hyperlinks piracy sorting program 112 has identified on the web pages of the websites displayed in column 804. The websites are ranked in descending order of the number of URL hyperlinks identified on each website. Piracy sorting program 112 displays a visual representation of threshold 808 on list of websites 800. Threshold 808 is a pre-programmed value for the number of URL hyperlinks piracy sorting program 112 identifies. In this example, threshold 808 is set at 100. URL hyperlinks and piracy sorting program 112 can use threshold 808 as a scale for editing list of website 800. Websites ranking above threshold 808 can remain on website list 800 for future examination performed by piracy sorting program 112. Piracy sorting program 112 can remove websites ranking below threshold 808. In another embodiment, the user can manually select and remove websites ranking below threshold 808 from website list 800.

Figure 9:
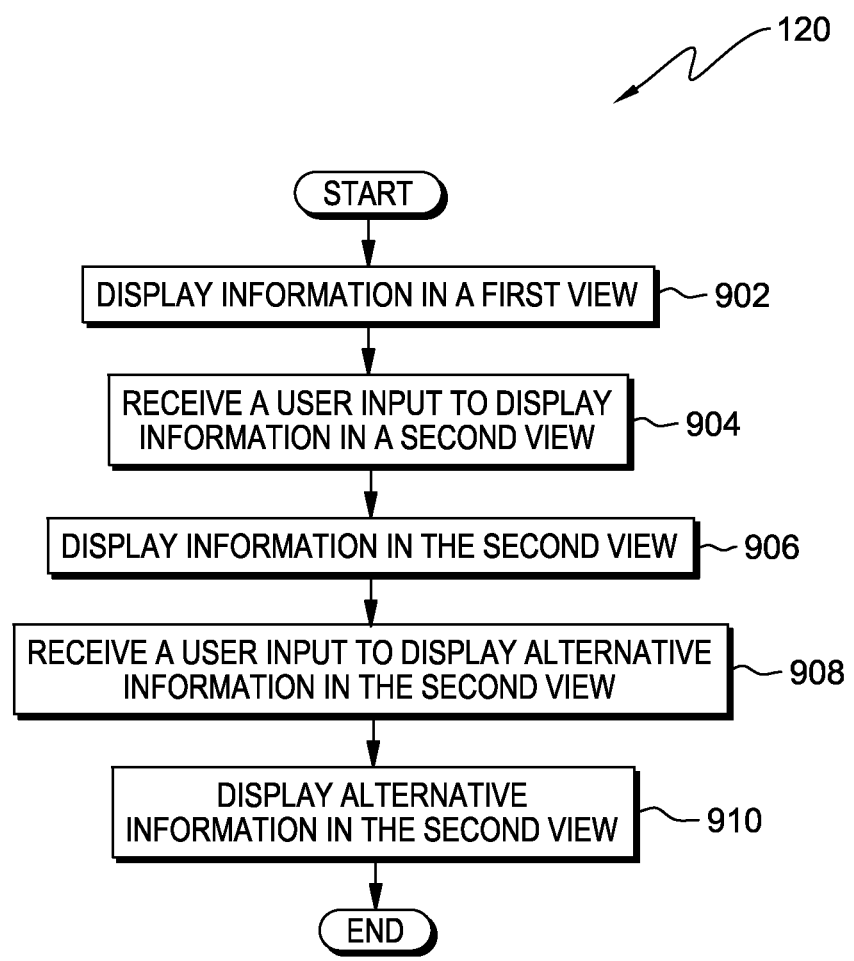
FIG. 9 is a flowchart depicting operational steps of a report generation process for generating reports, in accordance with an embodiment of the present invention.

FIG. 9 is a flowchart depicting operational steps of report generation process 120 for generating reports, in accordance with an embodiment of the present invention.

Report generation process 120 takes rankings of the websites and URL hyperlinks and displays the information in a first view (step 902). The first view, also know as the default view is the initial presentation (i.e., report) report generation process 120 presents to the user. In one embodiment, the default view is a bar graph format where report generation process 120 displays the number of times a primary URL hyperlink has been identified in a bar graph. The bar graph acts as quick reference for displaying the basic information of the primary URL hyperlinks mentioned the most amount of times on the scanned websites. Report generation process 120 also displays the number of primary URL hyperlinks each scanned website provided in a bar graph for quick reference. The default view of report generation process 120 can be pre-programmed according to the preference of the user. Typically, there is a correlation between the information displayed in the default view and the scope of the examination being performed by piracy sorting program 112. Since piracy sorting program 112 can collect a considerable amount of information, the default view can contain just the information relevant to the scan performed.

Report generation process 120 receives a user input to display the information in an alternative view (step 904). Report generation process 120 can have a feature where a user can select how and what information is displayed. If the user wants to have the same information displayed in an alternative view different from the default view of report generation process 120, the user can select from pre-programmed views which report generation process 120 is going to use to display the information. In one embodiment, a separate window can be prompted by the user via an input where the separate window contains the names of various ways in which the information can be presented. Through this prompted window, the user can select the alternative second view in which report generation process 120 presents the information. In another embodiment, a user can select to have the information exported to a separate program capable of displaying the information. For example, report generation process 120 can receive an input to export the information and data to separate program (e.g., MS Excel) capable of displaying said information and data.

Report generation process 120 displays the information in a second view (step 906). The second view selected by the user in step 904 is displayed along with the information and data. Report generation process 120 can display the second view along with the first view or report generation process 120 can minimize the first view and display just the second view to the user.

Report generation process 120 accepts a user input to display alternative information in the second view (step 908). Besides report generation process 120 having a feature where a user can select how information is displayed, report generation process 120 can have a feature where the user can select what information is displayed. Report generation process 120 can have a list of pre-programmed titles corresponding to all the various types of information collected. An example of a title and corresponding information may be, "Ranking of URL hyperlinks" where the corresponding information is how report generation process 120 has ranked each URL hyperlink. Another example may be, "Source Website for URL hyperlinks" where the corresponding information is a list of each identified URL hyperlink and the website on which each URL hyperlink was identified. If the user wants to have the alternative information displayed in the second view, the user can select from pre-programmed titles and then report generation process 120 displays the information corresponding to the selected pre-programmed titles. In one embodiment, a separate window can be prompted by the user via an input where the separate window contains the title of the available corresponding information which can be displayed in the current view. The user can manually select the titles so report generation process 120 can display the information corresponding to the selected titles in the current view.

Report generation process 120 displays the alternative information in the second view (step 910). Once the input from the user containing the title selections are received, report generation process 120 displays the information corresponding to each title in the second view. Due to the potential of piracy sorting program 112 having an extensive amount of information to display to a user, report generation process 120 can have the flexibility to swap the information from the current view report generation process 120 presents to the user. For example, if report generation process 120 displays a first portion of ranked URL hyperlinks in a first view, report generation process 120 can receive an input to display a second portion of the ranked URL hyperlinks in a second view which were not previously visible in the first view. Report generation process 120 can display both, the first and the second portion of the ranked URL hyperlinks simultaneously for the user to view.

Figure 10:
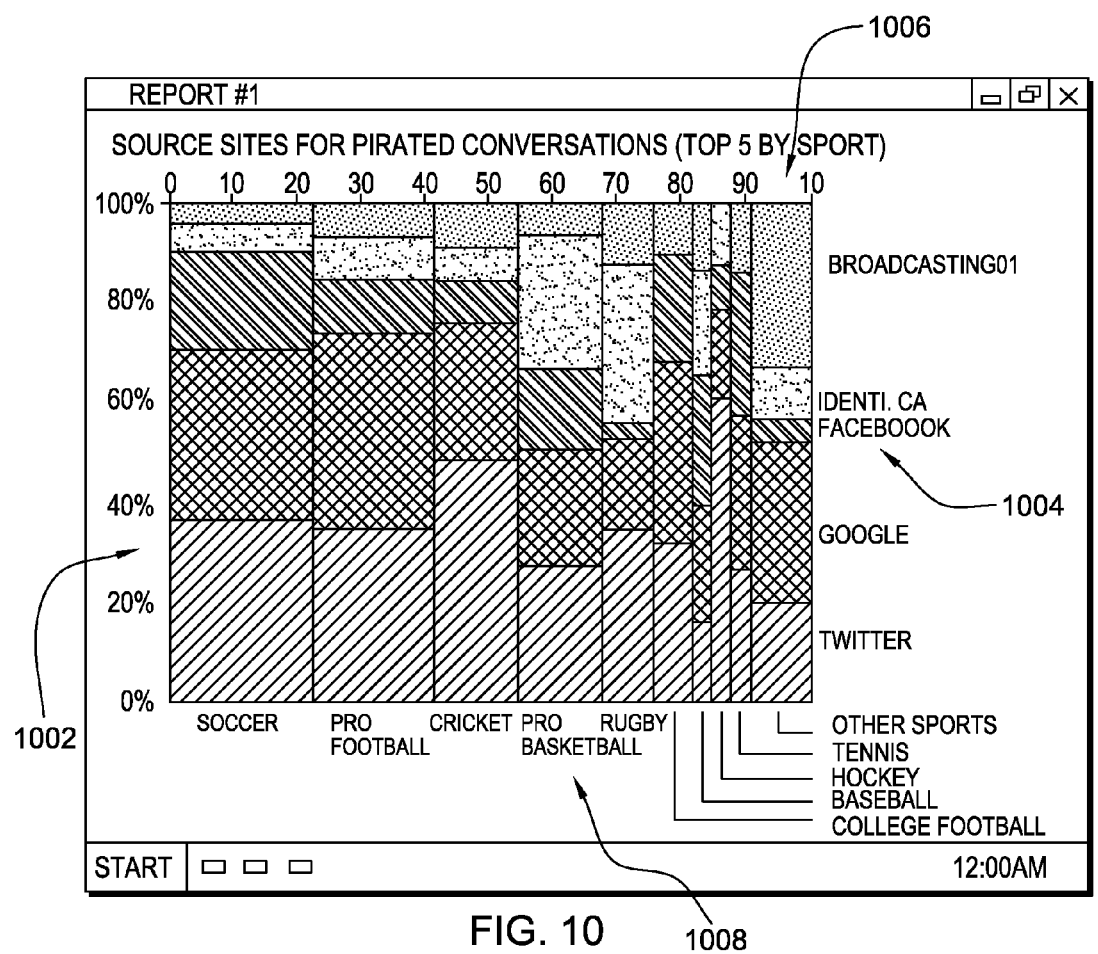
FIG. 10 is an example of information being displayed in a first view to a user, in accordance with an embodiment of the present invention.

FIG. 10 is an example of information being displayed in a first view to a user, in accordance with an embodiment of the present invention.

In this embodiment, piracy sorting program 112 determines the top five ranked websites providing URL hyperlinks among identified corresponding keywords. The keywords searched for by piracy sorting program 112 were related to various types of sports. Through user inputs, piracy sorting program 112 displays a correlation between the top five websites and a percentage of the identified URL hyperlinks corresponding to each sport. Piracy sorting program 112 displays left y-axis 1002 as a percentage of each of the websites containing URL hyperlinks to a specific sport. Since the focus is on the top five websites containing URL hyperlinks as shown on right y-axis 1004, the percentage of each of the five websites equals the sum of 100 percent. Piracy sorting program 112 displays top x-axis 1006 as a percentage of each of the specific sport identified through the keywords corresponding to the identified URL hyperlink. Bottom x-axis 1008 represents each of the specific sports identified. Such a visual representation of the information collected by piracy sorting program 112 allows for the user to view which website contains URL hyperlinks to potential pirated media content of a given sport.

Figure 11:
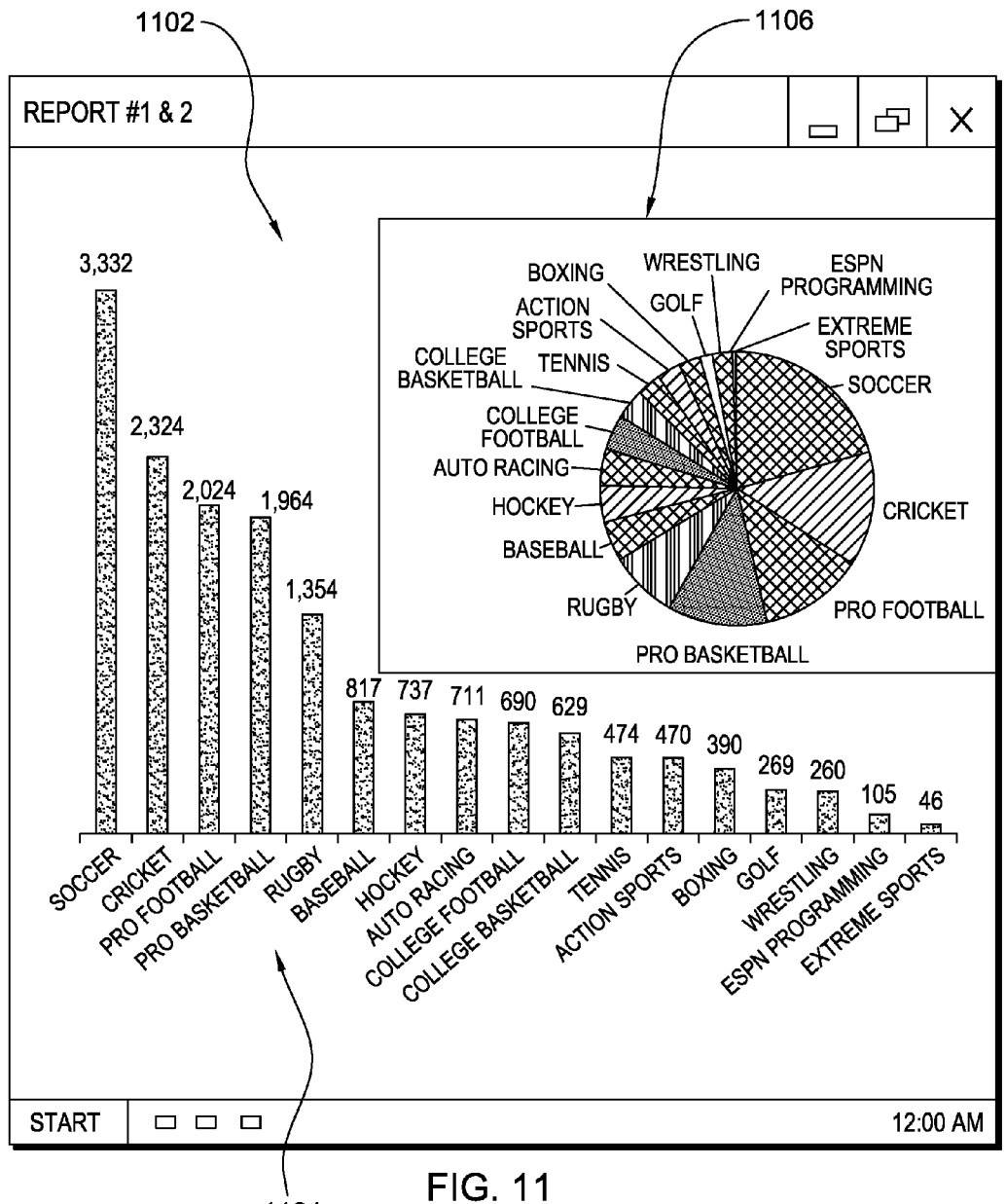
FIG. 11 is an example of information being displayed in a first view and a second view simultaneously to a user, in accordance with an embodiment of the present invention.

FIG. 11 is an example of information being displayed in a first view and second view simultaneously to a user, in accordance with an embodiment of the present invention.

In this example, piracy sorting program 112 compiled a list of 6,412 URL hyperlinks which were identified as containing potential pirated media content. Within the list of 6,412 identified URL hyperlinks, piracy sorting program 112 identified a sport associated with each of the identified URL hyperlinks through the associated keywords. Bar graph 1102 represents the breakdown of the identified URL hyperlinks. Bottom x-axis 1104 consists of all of the sports piracy sorting program 112 has identified during the examination. Bottom x-axis 1104 has the sports positioned in ranking order from most identified to least identified by piracy sorting program 112. Along with piracy sorting program 112 representing the identified URL hyperlinks in bar graph 1102 in the first view, piracy sorting program 112 also represents said URL hyperlinks in pie chart 1106. The information piracy sorting program 112 displays in the first view (i.e., bar graph) is the same as the second view (i.e., pie chart) but the visual representation is what differs. In another embodiment, not shown in FIG. 11, piracy sorting program 112 does not display bar graph 1102 in conjunction with pie chart 1106. Instead, bar graph 1102 is viewed by the user and piracy sorting program 112 receives an input to display pie chart 1106. Piracy sorting program 112 ceases the display of the first view and displays the second view according to the user input.

Figure 12:
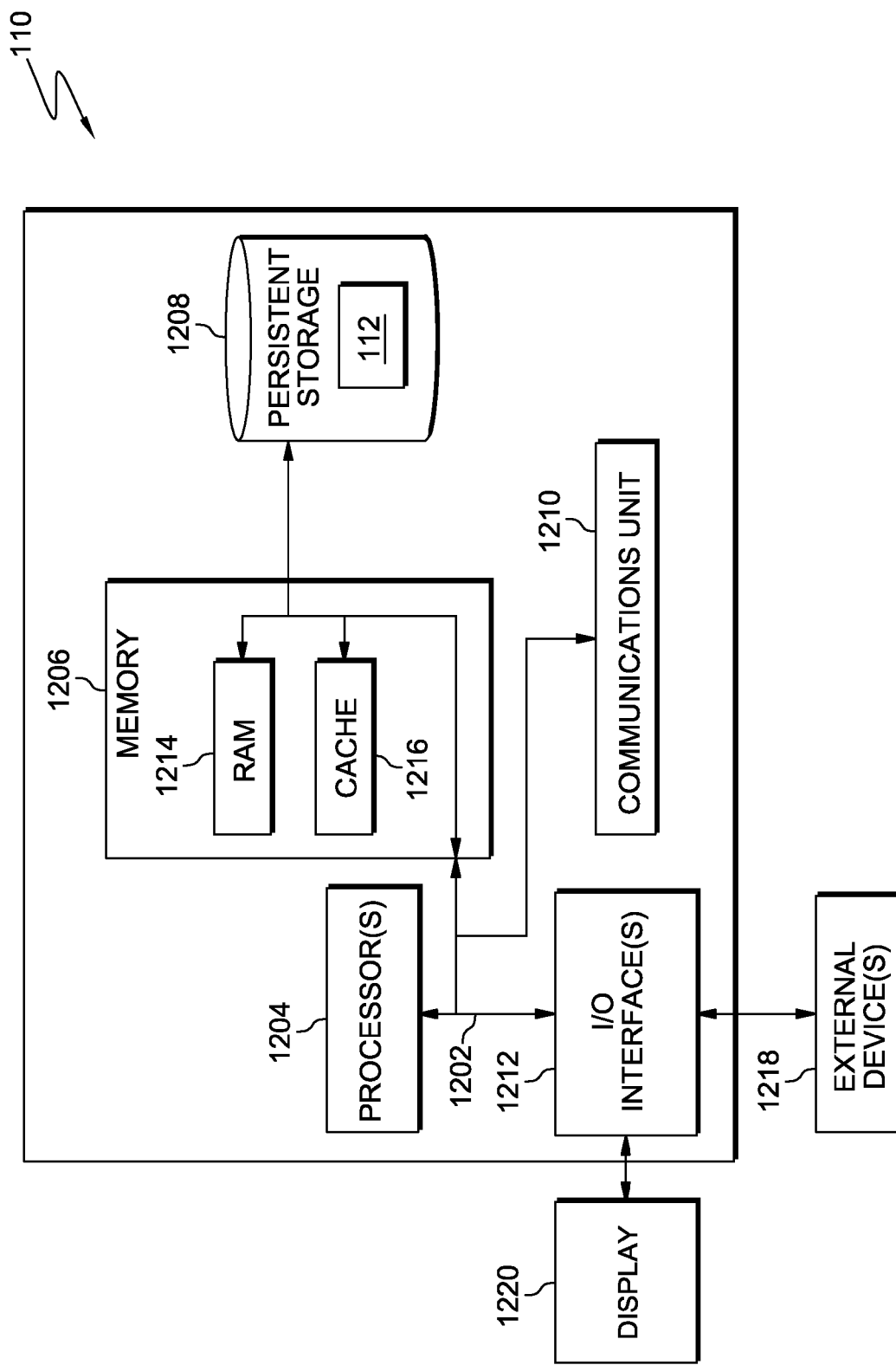
FIG. 12 is a block diagram of components of a computer system, such as the computer server of FIG. 1, in accordance with an embodiment of the present invention.

FIG. 12 depicts a block diagram of components operating piracy sorting program 112 within server computer system 110, in accordance with an illustrative embodiment of the present invention. It should be appreciated that FIG. 12 provides only an illustration of one implementation and does not imply any limitations with regard to the environments in which different embodiments may be implemented. Many modifications to the depicted environment may be made.

Computer server 110 includes communications fabric 1202, which provides communications between computer processor(s) 1204, memory 1206, persistent storage 1208, communications unit 1210, and input/output (I/O) interface(s) 1212. Communications fabric 1202 can be implemented with any architecture designed for passing data and/or control information between processors (such as microprocessors, communications and network processors, etc.), system memory, peripheral devices, and any other hardware components within a system. For example, communications fabric 1202 can be implemented with one or more buses.

Memory 1206 and persistent storage 1208 are computer-readable storage media. In this embodiment, memory 1206 includes random access memory (RAM) 1214 and cache memory 1216. In general, memory 1206 can include any suitable volatile or non-volatile computer-readable storage medium.

Piracy sorting program 112 stored in persistent storage 1208 for execution by one or more of computer processors 1204 via one or more memories of memory 1206. In this embodiment, persistent storage 1208 includes a magnetic hard disk drive. Alternatively, or in addition to a magnetic hard disk drive, persistent storage 1208 can include a solid state hard drive, a semiconductor storage device, a read-only memory (ROM), an erasable programmable read-only memory (EPROM), a flash memory, or any other computer-readable storage medium that is capable of storing program instructions or digital information.

The media used by persistent storage 1208 may also be removable. For example, a removable hard drive may be used for persistent storage 1208. Other examples include optical and magnetic disks, thumb drives, and smart cards that are inserted into a drive for transfer onto another computer-readable storage medium that is also part of persistent storage 1208.

Communications unit 1210, in these examples, provides for communications with other data processing systems or devices, including systems and devices within or controlled by computer server 110. In these examples, communications unit 1210 includes one or more wireless network interface cards. Communications unit 1210 may provide communications through the use of either or both physical and wireless communications links. Computer programs and processes, such as piracy sorting program 112, may be downloaded to persistent storage 1208 through communications unit 1210, or uploaded to another system through communications unit 1210.

I/O interface(s) 1212 allows for input and output of data with other devices that may be connected to computer 110. For example, I/O interface(s) 1212 may provide a connection to external device(s) 1218 such as a keyboard, a keypad, a touch screen, and/or some other suitable input device. External device(s) 1218 can also include portable computer-readable storage media such as, for example, thumb drives, portable optical or magnetic disks, and memory cards. Software and data used to practice embodiments of the present invention can be stored on such portable computer-readable storage media and can be loaded onto persistent storage 1208 via I/O interface(s) 1212. I/O interface(s) 1212 may also connect to a display 1220.

Display 1220 provides a mechanism to display data to a user and may be, for example, a touch screen or a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for identifying and ranking URI, hyperlinks to possible pirated media content, the method comprising:

searching on a computer, by one or more processors, a web page from a first website for one or more indicator keywords, wherein a strength of an indicator keyword is related to a likelihood of pirated media content;

responsive to the computer locating a plurality of instances of the one or more indicator keywords, the computer identifying, by one or more processors, a plurality of hyperlinks respectively associated with one or more of the plurality of instances;

weighting on the computer, by one or more processors, the identified plurality of hyperlinks based on at least one of: a strength of associated indicator keywords, number of associated indicator keywords, number of times each hyperlink was identified, and date of posting;

ranking on the computer, by one or more processors, the plurality of hyperlinks according to weight indicating a relative likelihood that respective hyperlinks point to pirated media content in a ranked list;

determining, by one or more processors on the computer, whether each of the identified plurality of hyperlinks associated with one or more of the plurality of instances has met one or more thresholds, wherein the one or more thresholds are based on at least one or more of: a ratio of strong indicator keywords to weak indicator keywords, a number of strong indicator keywords, and a proximity of each of the plurality of hyperlinks to the one or more indicator keywords;

responsive to determining one or more of the identified plurality of hyperlinks has not met the one or more thresholds, the computer removing the one or more of the identified plurality of hyperlinks from the ranked list;

displaying the ranked list on a display screen of said computer to direct a user to one or more web pages that may contain pirated media content of copyrighted media; and said user identifying those web pages providing illegal access to said copyrighted media for protection thereof.

2. The method of claim 1, further comprising:

displaying, by one or more processors, a first portion of the rankings of the plurality of hyperlinks according to weight in a first view;

receiving, by one or more processors, an input to display a second portion of the rankings of the plurality of hyperlinks according to weight in a second view; and displaying, by one or more processors, the second portion of the rankings of the plurality of hyperlinks according to weight in the second view.

3. The method of claim 1, wherein weighting the identified plurality of hyperlinks further composes:
identifying, by one or more processors, a primary hyperlink for each of the plurality of hyperlinks; and determining, by one or more processors, a number of times respective primary hyperlinks have been identified.

4. A method for identifying and ranking URL hyperlinks to possible pirated media content, the method comprising:
searching on a computer, by one or more processors, a web page from a first website for one or more indicator keywords, wherein a strength of an indicator keyword is related to a likelihood of pirated media content;
responsive to the computer locating a plurality of instances of the one or more indicator keywords, the computer identifying, by one or more processors, a plurality of hyperlinks respectively associated with one or more of the plurality of instances;
weighting on the computer, by one or more processors, the identified plurality of hyperlinks based on at least one of a strength of associated indicator keywords, number of associated indicator keywords, number of times each hyperlink was identified, and date of posting;
identifying a primary hyperlink for each of the plurality of hyperlinks and determining a number of times respective primary hyperlinks have been identified;
ranking on the computer, by one or more processors, the plurality of hyperlinks according to weight indicating a relative likelihood that respective hyperlinks point to pirated media content in a ranked list;
determining, by one or more processors on the computer, whether each of the identified plurality of hyperlinks associated with one or more of the plurality of instances has met one or more thresholds, wherein the one or more thresholds are based on at least one or more of: a ratio of strong indicator keywords to weak indicator keywords, a number of strong indicator keywords, and a proximity of each of the plurality of hyperlinks to the one or more indicator keywords; and
responsive to determining one or more of the identified plurality of hyperlinks has not met the one or more thresholds, removing, by one or more processors, the one or more of the identified plurality of hyperlinks from the ranked list;
displaying on a display screen of said computer a first portion of the rankings of the plurality of hyperlinks according to weight in a first view;
receiving, by one or more processors on the computer, an input to display a second portion of the rankings of the plurality of hyperlinks according to weight in a second view;
displaying on the display screen of said computer the second portion of the rankings of the plurality of hyperlinks according to weight in the second view; and
a user viewing said rankings of the plurality of hyperlinks to direct the user to one or more web pages that may contain pirated media content of copyrighted media and identifying those web pages providing illegal access to said copyrighted media for protection thereof.

5. The method of claim 4, further comprising:
searching on the computer, by one or more processors, a second website for one or more indicator keywords in text posted to one or more web pages of the second website;
responsive to locating a second plurality of instances of the one or more indicator keywords, identifying on the computer, by one or more processors, a second plurality of hyperlinks associated with one or more of the second plurality of instances;
weighting on the computer, by one or more processors, the identified the second plurality of hyperlinks based on at least one of: a strength of associated keywords, number of associated keywords, number of times each hyperlink was identified, and date of posting; and
ranking on the computer the second plurality of hyperlinks according to weight.

6. The method of claim 5, further comprising:
weighting on the computer, by one or more processors, the first and second website based on at least one of: an average of the number of the plurality of hyperlinks identified per web page of each of the websites and a number of the plurality of hyperlinks provided by the web pages of each website; and
ranking on the computer, by one or more processors, the first and second website according to weight.

7. A non-transitory computer program product for identifying and ranking URL hyperlinks to possible pirated media content, the non-transitory computer program product comprising:
one or more non-transitory computer-readable storage media;
program instructions stored on the one or more non-transitory computer readable storage media which when executed by one or more processors, perform:
searching on a computer, by one or more processors, a web page from a first website for one or more indicator keywords, wherein a strength of an indicator keyword is related to a likelihood of pirated media content;
responsive to the computer locating a plurality of instances of the one or more indicator keywords, the computer identifying, by one or more processors, a plurality of hyperlinks associated with one or more of the plurality of instances;
weighting on the computer, by one or more processors, the identified plurality of hyperlinks based on at least one of: a strength of associated keywords, number of associated keywords, number of times each hyperlink was identified, and date of posting;
ranking on the computer, by one or more processors the plurality of hyperlinks according to weight indicating a relative likelihood that respective hyperlinks point to pirated media content in a ranked list;
determining, by one or more processors on the computer, whether each of the identified plurality of hyperlinks associated with one or more of the plurality of instances has met one or more thresholds, wherein the one or more thresholds are based on at least one or more of: a ratio of strong indicator keywords to weak indicator keywords, a number of strong indicator keywords, and a proximity of each of the plurality of hyperlinks to the one or more indicator keywords;
responsive to determining one or more of the identified plurality of hyperlinks has not met the one or more thresholds, the computer removing the one or more of the identified plurality of hyperlinks from the ranked list;
displaying the ranked list on a display screen of said computer to direct a user to one or more web pages that may contain pirated media content of copyrighted media; and
said user identifying those web pages providing illegal access to said copyrighted media for protection thereof.

8. The non-transitory computer program product of claim 7, further comprising program instructions, stored on the one or more computer-readable storage media, which when executed by one or more processors, perform:
displaying, by one or more processors, a first portion of the rankings of the plurality of hyperlinks according to weight in a first view;
receiving on the computer, by one or more processors, an input to display a second portion of the
rankings of the plurality of hyperlinks according to weight in a second view; and displaying, by one or more processors, the second portion of the rankings of the plurality of hyperlinks according to weight in the second view.

9. The non-transitory computer program product of claim 8, wherein weighting the identified plurality of hyperlinks further comprises program instructions, stored on the one or more computer-readable storage media, which when executed by one or more processors, perform:
identifying on the computer, by one or more processors, a primary hyperlink for each of the plurality of hyperlinks; and determining, by one or more processors, a number of times respective primary hyperlinks have been identified.

10. The non-transitory computer program product of claim 7, further comprising program instructions, stored on the one or more computer-readable storage media, which when executed by one or more processors, perform:
searching on the computer, by one or more processors, a second website for one or more indicator keywords in text posted to one or more web pages of the second website;
responsive to locating a second plurality of instances of the one or more indicator keywords, identifying, by one or more processors, a second plurality of hyperlinks associated with one or more of the second plurality of instances;
weighting on the computer, by one or more processors, the identified the second plurality of hyperlinks based on at least one of: a strength of associated keywords, number of associated keywords, number of times each hyperlink was identified, and date of posting; and
ranking on the computer, by one or more processors, the second plurality of hyperlinks according to weight.

11. The non-transitory computer program product of claim 10, further comprising program instructions, stored on the one or more computer-readable storage media, which when executed by one or more processors, perform:
weighting on the computer, by one or more processors, the first and second website based on at least one of: an average of the number of the plurality of hyperlinks identified per web page of each of the websites and a number of the plurality of hyperlinks provided by the web pages of each website; and ranking, by one or more processors, the first and second website according to weight.

12. The non-transitory computer program product of claim 7, wherein the program instructions stored on the one or more computer-readable storage media were downloaded over a network from a remote computing system.

13. The computer program product of claim 7, wherein the program instructions stored on the one or more non-transitory computer-readable storage media are stored on at least one computer-readable storage medium of a server computing system, and wherein the program instructions can be downloaded over a network by a remote computing system for storage on at least one computer-readable storage medium of the remote computing system.

14. A computer system for identifying and ranking URL hyperlinks to possible pirated media content, the computer system comprising:
one or more computer processors;
one or more computer-readable storage media;
program instructions stored on the one or more computer-readable storage media for execution by at least one of the one or more computer processors, which when executed, perform:
searching on a computer, by one or more processors, a web page from a first website for one or more indicator keywords, wherein a strength of an indicator keyword is related to a likelihood of pirated media content;
responsive to the computer locating a plurality of instances of the one or more indicator keywords, the computer identifying, by one or more processors, a plurality of hyperlinks associated with one or more of the plurality of instances;
weighting on the computer, by one or more processors, the identified plurality of hyperlinks based on at least one of: a strength of associated keywords, number of associated keywords, number of times each hyperlink was identified, and date of posting;
ranking on the computer, by one or more processors, the plurality of hyperlinks according to weight indicating a relative likelihood that respective hyperlinks point to pirated media content in a ranked list;
determining, by one or more processors on the computer, whether each of the identified plurality of hyperlinks associated with one or more of the plurality of instances has met one or more thresholds, wherein the one or more thresholds are based on at least one or more of: a ratio of strong indicator keywords to weak indicator keywords, a number of strong indicator keywords, and a proximity of each of the plurality of hyperlinks to the one or more indicator keywords;
responsive to determining one or more of the identified plurality of hyperlinks has not met the one or more thresholds, the computer removing the one or more of the identified plurality of hyperlinks from the ranked list;
displaying the ranked list on a display screen of said computer to direct a user to one or more web pages that may contain pirated media content of copyrighted media; and
said user identifying those web pages providing illegal access to said copyrighted media for protection thereof.

15. The computer system of claim 14, further comprising program instructions, stored on the one or more computer-readable storage media, which when executed by one or more processors, perform:
displaying, by one or more processors, a first portion of the rankings of the plurality of
hyperlinks according to weight in a first view; receiving, by one or more processors, an input to display second portion of the rankings of the plurality of hyperlinks according to weight in a second view; and displaying, by one or more processors, the second portion of the rankings of the plurality of hyperlinks according to weight in the second view.

16. The computer system of claim 15, wherein weighting the identified plurality of hyperlinks further comprises program instructions, stored on the one or more computer-readable storage media, which when executed by one or more processors, perform:
identifying, by one or more processors, a primary hyperlink for each of the plurality of hyperlinks; and determining, by one or more processors, a number of times respective primary hyperlinks have been identified.

17. The computer system of claim 14, further comprising program instructions, stored on the one or more computer-readable storage media, which when executed by one or more processors, perform:

searching, by one or more processors, a second website for one or more indicator keywords in text posted to one or more web pages of the second website;

responsive to locating a second plurality of instances of the one or more indicator keywords, identifying, by one or more processors, a second plurality of hyperlinks associated with one or more of the second plurality of instances;

weighting, by one or more processors, the identified the second plurality of hyperlinks based on at least one of: a strength of associated keywords, number of associated keywords, number of times each hyperlink was identified, and date of posting; and ranking the second plurality of hyperlinks according to weight.

18. The computer system of claim 17, further comprising program instructions, stored on the one or more computer-readable storage media, which when executed by one or more processors, perform:

weighting, by one or more processors, the first and second website based on at least one of: an average of the number of the plurality of hyperlinks identified per web page of each of the websites and a number of the plurality of hyperlinks provided by the web pages of each website; and ranking, by one or more processors, the first and second website according to weight.

* * * * *